United States Patent [19]

Lee

[11] Patent Number: 4,933,750
[45] Date of Patent: Jun. 12, 1990

[54] AUTO-MASTER PEDESTAL CONTROL CIRCUIT

[75] Inventor: Hyo-Sam Lee, Suwon, Rep. of Korea

[73] Assignee: Samsung Electronics Co., Ltd, Suwon, Rep. of Korea

[21] Appl. No.: 310,785

[22] Filed: Feb. 13, 1989

[30] Foreign Application Priority Data

Mar. 17, 1988 [KR] Rep. of Korea .................... 88-02883

[51] Int. Cl.$^5$ ............................................. H04N 9/72
[52] U.S. Cl. ........................................ 358/34; 358/32
[58] Field of Search .................................... 358/32, 34

[56] References Cited

U.S. PATENT DOCUMENTS

| 3,283,067 | 11/1966 | Bazin et al. | 358/34 |
| 3,548,083 | 12/1970 | Cahen | 358/34 |
| 3,651,248 | 3/1972 | Schnerder | 358/34 |
| 4,489,349 | 12/1984 | Okada | 358/32 |

Primary Examiner—John W. Shepperd
Attorney, Agent, or Firm—Ladas & Parry

[57] ABSTRACT

An auto-master pedestal control circuit is provided in which a master pedestal detector includes an amplifier, clamping circuit and integration circuit. The master pedestal detector detects a NAM video signal applied through an input terminal, and produces a direct current signal with a constant level. A logic operator (MICOM) compares a detected pedestal level with an internal predetermined reference level. A master pedestal controller adjusts a gain of a video signal which is composed of outputs of the logic operator and an amplifier. The amplifier is used for amplifying the inputted video signal.

5 Claims, 4 Drawing Sheets

AUTO-MASTER PEDESTAL CONTROL CIRCUIT

BACKGROUND OF THE INVENTION

The present invention relates to an auto-master pedestal control circuit which controls the position of pedestal to be accordance with the dimmest point on an actual screen at the processing of a video signal generated by a video camera.

In a conventional method, for the control of an auto-black balance, an applied video signal has been controlled to be accorded with a pedestal level which is predetermined in a constant level (7.5% for the U.S.A., 5.0% for Japan and 7.5% for Korea) on conditions with a closed lens cap mounted on a video camera. In such method, there is no reference signal to be distinguished for each scene.

However, since the pedestal level is established only with the lens cap closed and each object has different intensity of radiation, it is unreasonable for the fixed pedestal level to be applied to actual photographing for distinctness. The pedestal level established without a signal outside becomes a fixed constant. With this fixed constant of pedestal level it is impossible for the fixed pedestal level to be corresponded to the dimmest points in each respective scene, and it is impossible to obtain respective distinct screen pertaining to respective scene.

Therefore, in the electronic field processing system of a video camera equipped in the relay broadcasting car or studio in which long distance electrical transmission is processed, broadcasting engineer has been manually controlling the pedestal level with directly inspecting the conditions of the screen took by the video camera and through other instruments.

For the video cameras for the electronic news gathering system and general purposes, it is hard for the dimmest points to be accorded with the pedestal position as each dimmest point for each scene is different.

SUMMARY OF THE INVENTION

It is an object of the present invention to provide an auto-master pedestal control circuit which can always give not only a distinct screen but also convenience to the user with a pedestal level of a video signal automatically controlled in accordance with each scene using a microcomputer and a pedestal detector.

The present invention can be achieved in a way that an applied video signal is processed to be changed to an uniform direct current (DC) signal through the master pedestal detector and that the pedestal level of the video signal offered as an output of the microcomputer is controlled automatically.

The above object may be effected by providing an auto-master pedestal control circuit comprising:
  detecting means including an inverting amplification means, a clamping means and a integration means for detecting a NAM video signal or luminance video signal.
  a logic operation means connected to the detecting means and comparing a detected pedestal level with an inner reference level;
  an amplification means for amplifying an inputted video signal; and
  a master pedestal controlling means for controlling a gain provided by an output of the logic operation means and an output of the amplification means.

DETAILED DESCRIPTION OF THE PREFERRED EMBODIMENT

Referring to attached drawings, the representation of an embodiment applied to the present invention will now be described in detail.

Figure 1:
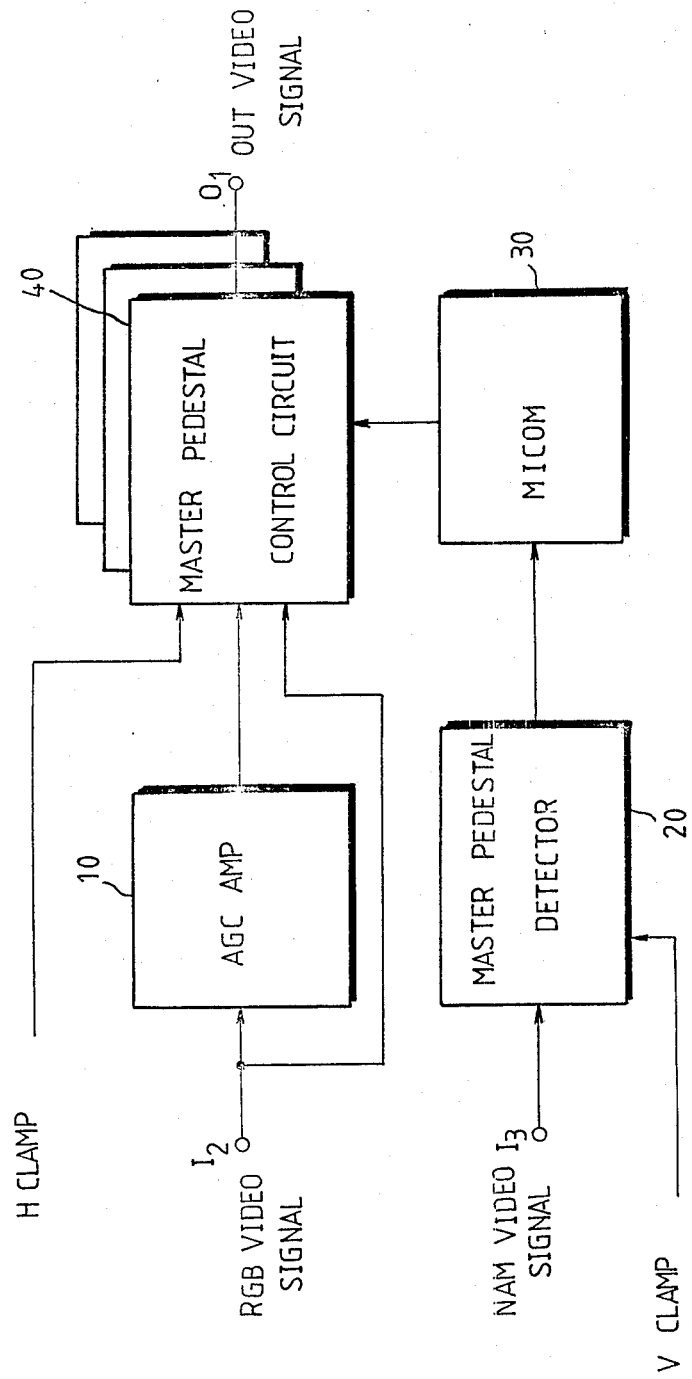
FIG. 1 is a block circuit diagram of a pedestal control circuit according to a preferred embodiment of the invention.

FIG. 1 is a block circuit diagram of an auto-master pedestal control circuit in which video signals red R, green G, and blue B inputted at an input terminal $I_2$ are applied to a master pedestal controller 40 and are also applied to the master pedestal controller 40 through an auto gain control(ACC) amplifier 10. An output video signal is applied to a next coupled stage(not shown) through an output terminal $O_1$. In the attached drawings and through the specification, the video signals are applied and explained to one of the master pedestal control circuits, while there is a respectively corresponding master pedestal controller for each video signal red, green and blue. The configuration and the operation of the remainder of the master pedestal controller are all the same.

A NAM video signal or luminance video signal applied to an input terminal $I_3$ is modulated to an uniform DC level through a master pedestal detector. The DC level is applied to the master pedestal controller 40 through a microcomputer 30 and a pedestal level of an output video signal is controlled by the control of the microcomputer 30.

Figure 4:
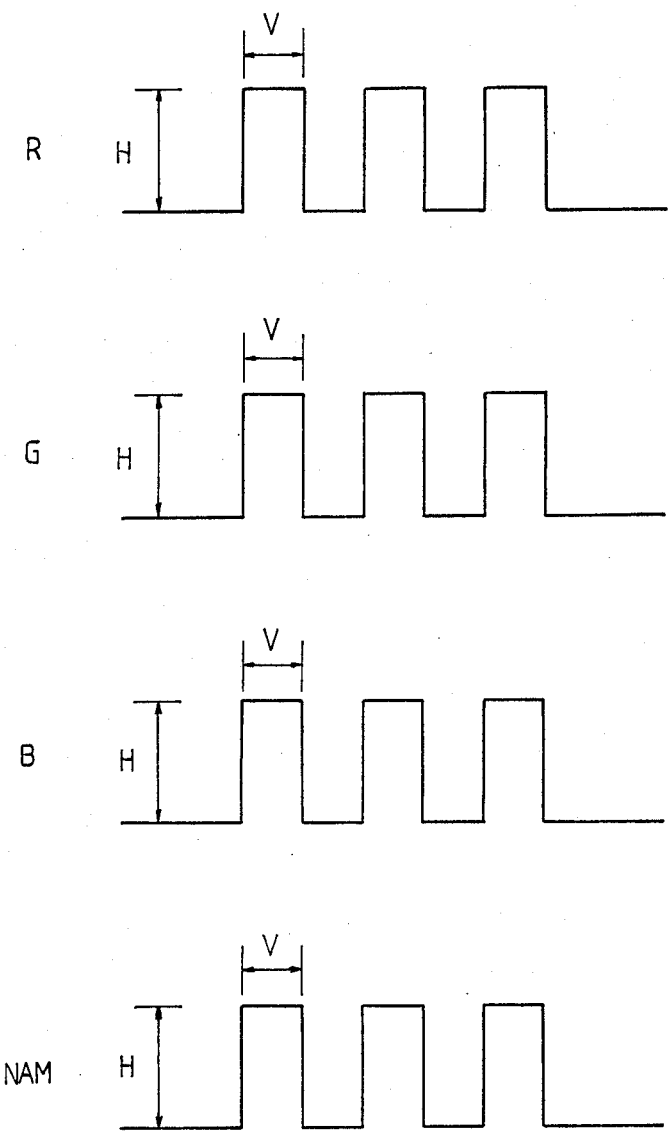
FIG. 4 illustrates waveforms corresponding to each color of red, green and blue, respectively, and a synthetic state of a NAM video signal or luminance video signal being used to the circuit according to the present invention.

With white colour exposed to a video camera using the final output signals of a video camera red, green and blue, the NAM video signal has a signal of $NAM=(R+G+B)/3$ as shown in FIG. 4.

These video signals R, G and B have identical amplitude H and pulse width V, and the identical NAM signal with the signals R, G and B can be obtained.

Figure 2:
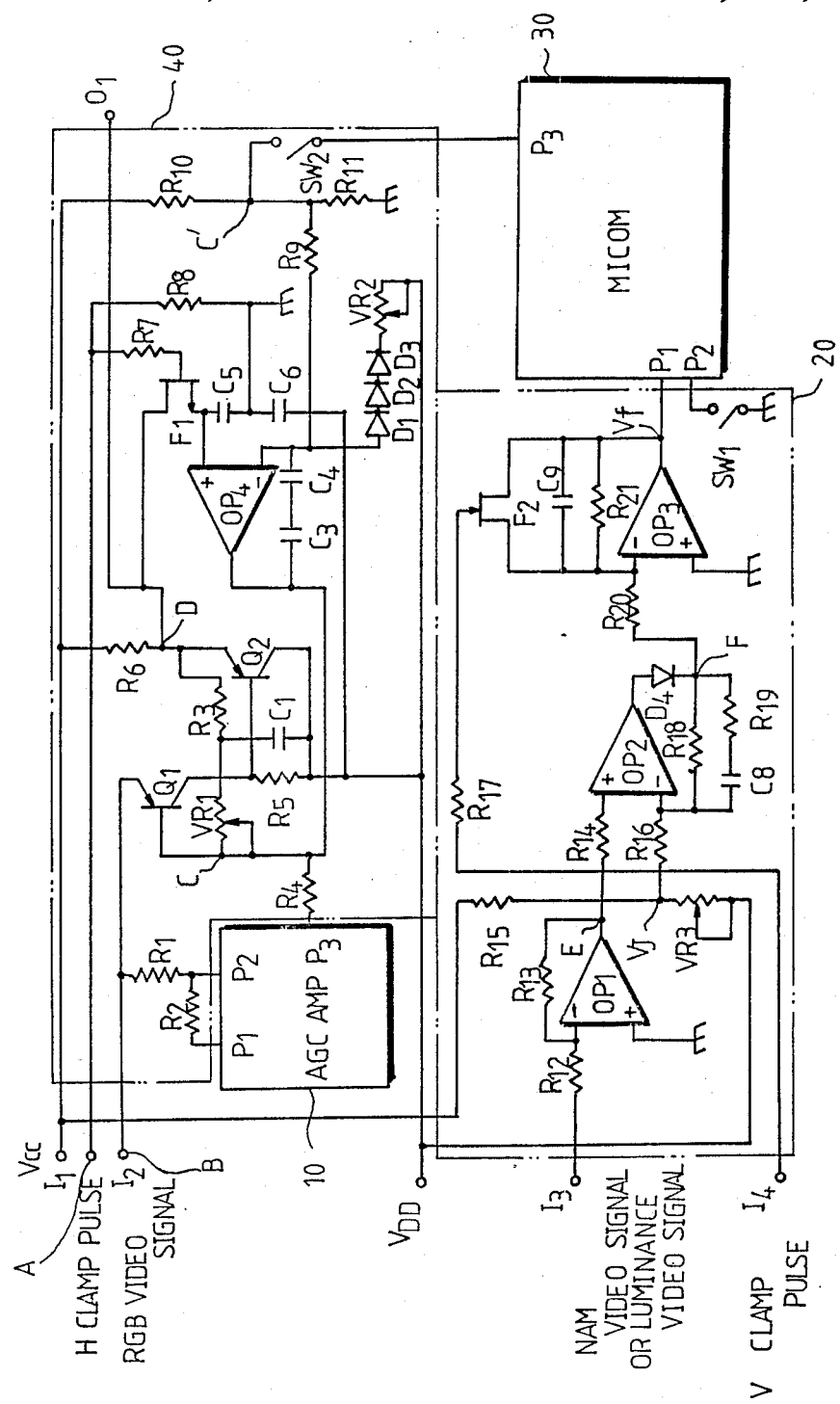
FIG. 2 is a circuit diagram of FIG. 1.

FIG. 2 is a circuit diagram of FIG. 1 in which the master pedestal detector 20 is arranged to apply the NAM video signal of the input terminal $I_3$ to a non-inverting input of an operation amplifier $OP_2$ through an inverting operation amplifier $Op_1$ coupled with resistors $R_{12}$–$R_{14}$. Supply voltages $V_{CC}$ and $V_{DD}$ are clamped by a feedback time constant composed of a diode $D_4$, resistors $R_{18}$ and $R_{19}$, and a capacitor $C_8$ with a reference voltage $V_J$ applied to an inverting side of the operation amplifier $OP_2$ through a variable registor $VR_1$ and registors $R_{15}$ and $R_{16}$.

In the next cascaded stage, circuits are arranged to detect an uniform DC level through an inverting integral operation amplifier $OP_3$ coupled with resistors $R_{20}$ and $R_{21}$ and a capacitor $C_9$. A vertical clamping pulse applied to an input terminal $I_4$ which is applied during the period of feedback, drives a field effect transistor $F_2$ coupled with the inverting integral operation amplifier $OP_3$ through a registor $R_{17}$ so that the detected values of DC level are reset for each constant vertical period.

An input terminal $I_2$ which receives the video signals R, G and B is connected to a transistor $Q_1$ in the master pedestal controller 40 and also connected to the auto gain control(AGC) amplifier 10 through registors $R_1$ and $R_2$. An output of the auto gain control amplifier 10 drives the transistor $Q_1$ through a resistor $R_4$ to amplify thereof, The amplified output is inputted into a buffer transistor $Q_2$ coupled with a bias registor $R_5$. The bias of the transistor $Q_1$ is controlled by adjusting both the integration lime constant of a resistor $R_3$ and a capacitor $C_1$, and a variable resistor $VR_1$ At the same time, the video signal is applied to the output terminal $O_1$ through a resistor $R_6$.

An output of the master pedestal detector 20 across the microcomputer 30 is arranged to adjust the bias of the transistor $Q_1$ through registors $R_9-R_{11}$, diodes $D_1-D_3$, a variable registor $VR_2$, and an integral operation amplifier $OP_4$ with capacitors $C_3-C_6$ A horizontal clamping pulse applied through an input terminal $I_1$ drives a field effect transistor $F_1$ which is coupled with bias registors $R_7$ and $R_8$, the integral operation amplifier $OP_4$, and the output terminal $O_1$. Such configuration leads to clamp an output video signal.

The symbols $SW_1$ and $SW_2$ are manual switches coupled with the input and output of the microcomputer 30: the switch $SW_1$ is used to drive the microcomputer 30 and the switch $SW_2$ is used for controlling an output from the master pedestal detector 20.

The MICOM 30 using 8 bit elements is designed to compensate the difference between the DC level applied to the terminal $P_1$ and the reference signal internally programed.

The terminal $P_1$ which is an input terminal for detecting date receives an analog to digital signal converted internally, the terminal $P_2$ is used to check the on-off input signal of auto-master pedestal.

The terminal $P_3$ is an output terminal. The MICOM 30 can be used HD6303 element made by HITACHI company.

Figure 3:
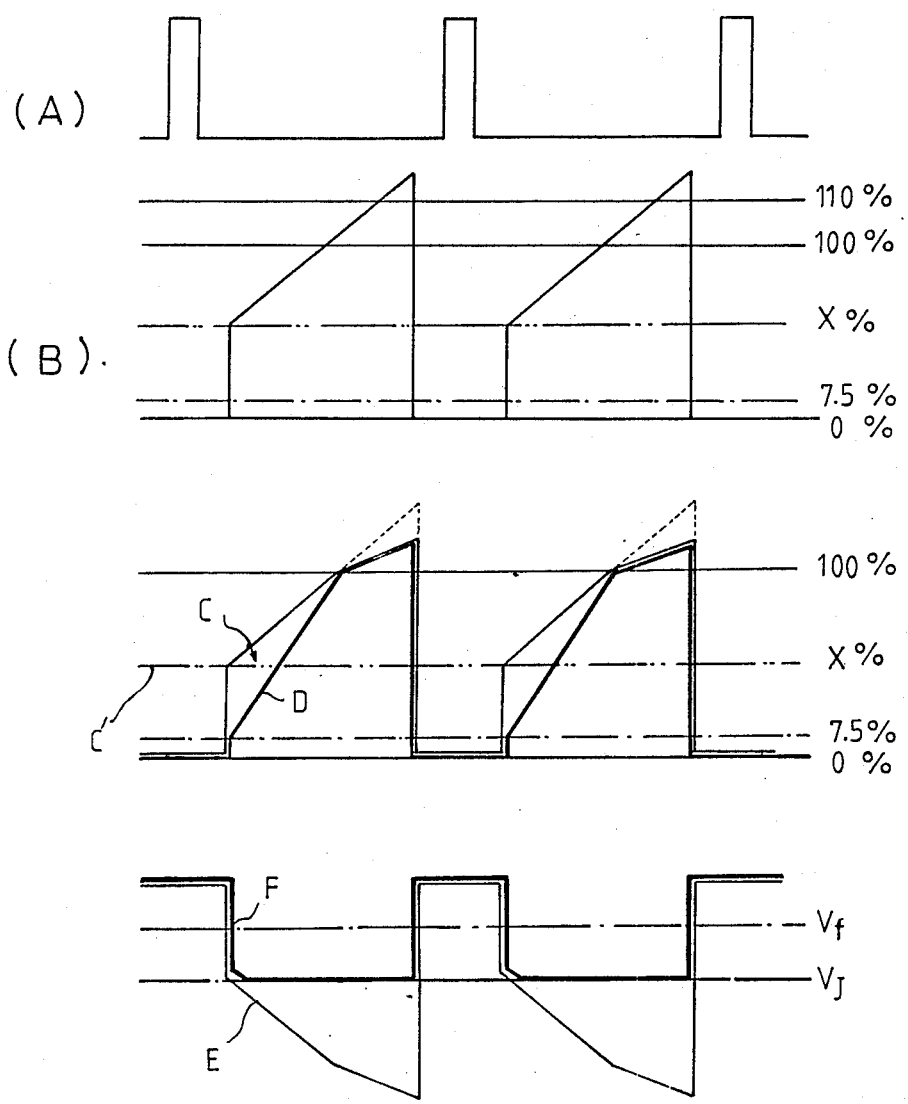
FIG. 3 illustrates a respectively corresponding waveform at a respective node.

FIG. 3 shows a respectively corresponding waveform at a respective node in the circuit shown in FIG. 2.

The operation of the circuit is as follows.

In FIG. 2, the master pedestal detector 20 detects the NAM video signal applied to the input terminal 13 which is equal to $(R+G+B)/3$ in photographing white colour, and generates an uniform DC level.

The NAM video signal applied to the input terminal $I_3$ is amplified through the invention operation amplifier $OP_1$ to be a waveform E shown in FIG. 3, and this waveform E is applied to the non-invention input terminal of the operation amplifier $OP_2$ and the reference voltage $V_j$ generated by dividing power supply voltage with the resistors $R_{15}$ and $VR_3$ is applied to the inverting terminal of the operation amplifier $OP_2$. The output signal of the operation amplifier $OP_2$ is clamped to be a waveform F depicted in FIG. 3 by the clamping diode $D_4$ and the feedback time constant caused by the resistors $R_{16}$ and $R_{19}$ and the capacitor $C_8$. The capacitor $C_8$ and the resistor $R_{19}$ is used.

The clamped output signal E in FIG. 3, is applied to the inverting terminal of the inverting integral operation amplifier $OP_3$ connected with the registors $R_{20}$ and $R_{21}$ the capacitor $C_9$, and changed into an output signal of DC level $V_f$. That is, when a vertical calmping signal is applied to the input terminal $I_4$ during a blanking interval, the FET $F_2$ is turned on through the resistor $R_{17}$ and the output signal of the operation amplifier $OP_3$ is resetted through the FET $F_2$ for each vertical period.

Therefore, the NAM video signal or luminance video signal applied to the input terminal $I_3$ after a vertical periods can be detected as an uniform DC level $V_f$.

The NAM video signal applied to the input terminal $I_3$ is equal to $(R+C+B)/3$ and the peak to peak value of each signal of R, G and B is all the same. In this case, a luminance signal may be used in place of the NAM video signal, but the signal whose ratio of R, G and B is 1:1:1 through signal processing in photographing is used without modulation in the field of a video camera.

Therefore, the MICOM 30 detects the DC level of the NAM video signal applied to the input terminal $P_1$ and compares it with the reference level internally programmed and generates the output signal of the difference obtained from the comparision towards the terminal $P_3$.

In the master pedestal controller 40, the pedestal level of the applied signals of R, G and B to the input terminal $I_2$ is automatically controlled and is amplified through the amplifier 10.

This AGC amplifier which is a high radiation intensity compressor compressing any signal having a gain over the fixed level, generates an uniform signal having a constant level from 0% to 11%. With such generated uniform signal the transistor $Q_1$ is turned on through the bias resistor $R_4$.

With the transistor $Q_1$ truned on, one of the amplified video signals R, G and B is applied to the master pedestal controller 40 and is applied to the terminal $O_1$ through the transistor $Q_2$ connected with the bias resistor $R_5$, and consurrently the bias voltage of the transistor $Q_1$ is controlled by the time constant of feedback integtrator consists of the resistors $R_3$ and $VR_1$ and the capacitor $C_1$. At this time, the feedback is negative.

Since the devided voltages of the supply voltages $V_{CC}$ and $V_{DD}$ through the resistors $R_9$, $R_{10}$ and $VR_2$ is applied to the inverting input terminal. The output signal of the operation amplifier $OP_4$ contributes to control the bias voltage of the transistor $Q_1$ and the relationship $V_{CC} > V_{DD}$ is valid. The capacitors $C_3$ and $C_4$ play a role of supplying an uniform DC power by being integrated with the resistors $R_9$, $R_{10}$, $R_{11}$ and $VR_2$. The diode $D_1$, $D_2$ and $D_3$ are used for temperature compensation. The FET $F_1$ connected with the inverting amplifier $OP_4$ is driven by the clamping pulse H applied to the inverting operation amplifier $OP_4$. The clamping pulse is outputted with the synchronization to a horizontal synchronization signal.

Therefore, with the increment of output current in the emitter of the transistor $Q_2$, the off-set voltage is adjusted by the capacitor $C_5$ which is charged from the output of $Q_2$ through the transistor $F_1$, and by which the inverting operation amplifier $OP_4$ is controlled to stabilize the output of the transistor $Q_1$.

In the end, the pedestal level of the video signal-the output of the transistor $Q_1$ — is defined by the combination of the resistors $R_9-R_{11}$, the variable resistor $VR_2$.

Hereinabove, at the control of auto pedestal level, the output value defined by the variable resistor $VR_2$ and the output value of the terminal $P_3$ in the MICOM 30 are synthesized to control the level of the video signal. That is, as shown in FIG. 3, the MICOM 30 controls the pedestal level by the invernally programmed reference signal with the NAM video signal $V_f$ which is obtained by the integration of the inverted, clamped signal.

The video signal B applied the input terminal $I_2$ is outputted as a compressed signal C of over-intensity of radiation by the AGC amplifier 10, as shown in FIG. 3.

According to the present invention, with the compressed signal of over-intensity of radiation, high gain level is compensated.

To accord the dimmest point in video signals with the pedestal the dimmest point is detected by the NAM signal and changed into a DC level, and then the dimmest point is automatically controlled to be positioned to the pedestal level using the MICOM 30.

The output of the operation amplifier $OP_4$ controls the output of the transistor $Q_1$ and $Q_2$ to convert the lowest video signal level of X% to 7.5% in the output of the transistor $Q_2$ as the waveform D in FIG. 3.

The master pedestal level can be decreased below negative value from the value $7.5\%$ for an initial condition at which the lens cap of the video camera is closed, Summary of the operations represented hereinabove are as follows. With the switches $SW_1$ and $SW_2$ connected the MICOM 30 turned off, the terminal $P_3$ is off, so that the pedestal level of a video signal is manually adjusted by the variable resistor $V_R$ because the supply voltages $V_{CC}$, $V_{DD}$ are adjusted by the resistors $R_9$, $R_{10}$, $R_{11}$, $VR_2$ with the switches $SW_1$ and $SW_2$ turned on, the NAM video signal supplied to the input terminal $I_4$ is detected in an uniform DC level. Using this uniform DC level through the MICOM 30, the lowest pedestal level X% of the video signal is adjusted to be below 7.5% as the waveform D in FIG. 3. Thus the distinct screen can be automatically obtained for each scene.

For applying the present invention to a video camera, gain band width is improved moreover the present invention is widely applicable to a monitor and video relative equipments.

As described above, the present invention provides the automaster pedestal control circuit which improves the picture quality with the automatic control of the pedestal level of the video signal using the detected, constant direct current converted from the dimmest points; and improves convenience and reliability with the automatic control process.

This invention is in no way limited to the example described hereinabove. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

What is claimed is:

1. An auto-master pedestal control circuit for a video camera, comprising:
    NAM video signal-input means for providing a NAM input signal; master pedestal detecting means having a gain adjusting means for detecting the inputted NAM video signal and converting thereof to a direct current signal with a constant level;
    logic operation means for comparing a detected pedestal level with an internal predetermined reference level;
    video signal-input means for providing video signals of red, green, and white;
    amplification means for amplifying the inputted video signals; and master pedestal control means for adjusting a gain of a video signal composed of outputs of the logic operation means and the amplification means.

2. An auto-master pedestal control circuit for a video camera as claimed in claim 1 wherein said gain adjusting means comprises: driving means for driving first and second transistors, the first transistor being driven by the output of said amplification means through a first bias register, the second transistor being driven by an output from the first transistor through a second bias register, wherein an output video signal from the second transistor is applied to a device coupled with an output terminal; and first bias-adjusting means for adjusting a bias of said first transistor through a resistor, a capacitor and a variable register.

3. An auto-master pedestal control circuit for a video camera as claimed in claim 1 wherein said master pedestal detecting means comprises:
    inverting amplification means including a first operation amplifier and resistors, an inverting input of said first operation amplifier receiving said NAM video signal with a constant blanking direct current level;
    first clamping means including a second operation amplifier for clamping an output of the second operation amplifier by comparing a reference voltage with an output of the first operation amplifier applied to an inverting input of the second operation amplifier, the reference voltage being applied to an non-inverting input of the second operation amplifier from a supply voltage, the clamping operation being taking place by a feedback time constant caused by a combination of diode, resistor and capacitor;
    integration means including, in combination, a third operation amplifier, resistors and a capacitor for converting to a direct current from the second operation amplifier an clamped output; and resetting means for providing a constant level of said direct current by resetting an output from the third operation amplifier in response to a vertical clamp pulse.

4. An auto-master pedestal control circuit for a video camera as claimed in claim 1 wherein said master pedestal control means comprises gain control means for controlling said gain adjusting means; and second clamping means for clamping an output of the output terminal in response to a horizontal clamping pulse.

5. An auto-master pedestal control circuit for a video camera as claimed in claim 1 characterized in that a signal to be applied to said master pedestal detecting means is a luminance signal.

* * * * *